United States Patent [19]

Tadenuma et al.

[11] Patent Number: 5,004,776

[45] Date of Patent: Apr. 2, 1991

[54] STABILIZED CHLORINE-CONTAINING RESIN COMPOSITION

[75] Inventors: Masahiko Tadenuma, Akigawa; Tetsuhiro Miyagi, Akishima; Tadashi Miyazawa, Sagamihara, all of Japan

[73] Assignee: Akishima Chemical Industries Co., Ltd., Tokyo, Japan

[21] Appl. No.: 382,484

[22] Filed: Jul. 19, 1989

[30] Foreign Application Priority Data

Apr. 27, 1989 [JP] Japan ................... 1-106068

[51] Int. Cl.$^5$ .............................................. C08K 11/00
[52] U.S. Cl. ................................. 524/377; 524/399; 524/436; 524/450
[58] Field of Search ............... 524/450, 436, 399, 386, 524/387, 327, 368, 380, 377

[56] References Cited

U.S. PATENT DOCUMENTS

| | | | |
|---|---|---|---|
| 2,968,642 | 1/1961 | Le Suer | 260/45.75 |
| 2,971,014 | 2/1961 | Mastin | 260/398 |
| 3,147,232 | 9/1964 | Norman et al. | 260/23 |
| 3,533,975 | 10/1970 | Scullin | 260/23 |
| 4,000,100 | 12/1976 | Baldyga | 524/450 |
| 4,159,973 | 7/1979 | Hoch et al. | 260/23 |
| 4,252,698 | 2/1981 | Ito et al. | 260/18 |
| 4,659,764 | 4/1987 | Isao et al. | 524/399 |
| 4,861,816 | 8/1989 | Kobayashi et al. | 524/399 |

FOREIGN PATENT DOCUMENTS 60-161451 8/1985 Japan.
61-91238 5/1986 Japan.

*Primary Examiner*—Veronica P. Hoke
*Attorney, Agent, or Firm*—Beveridge, DeGrandi & Weilacher

[57] ABSTRACT

A thermally stabilized chlorine-containing resin composition comprising a chlorine-containing resin and a stabilizer consisting essentially of (a) an overbased alkaline earth metal carboxylate or phenolate complex, (b) zeolite, (c) calcium hydroxide and (d) a complex of at least one metal perchlorate selected from the group consisting of sodium, magnesium, calcium and barium perchlorates with at least one compound selected from the group consisting of polyhydric alcohols and their derivatives. The stabilizer consisting essentially of the above four components (a) to (d) exhibits excellent effects in the prevention of the discoloration and the deterioration in physical properties of the chlorine-containing resin, both accompanying the thermal degradation caused when the resin is subjected to thermoforming, particularly powder molding or exposed to a high temperature atmosphere for a long period of time.

26 Claims, No Drawings

STABILIZED CHLORINE-CONTAINING RESIN COMPOSITION

This invention relates to a thermally stabilized chlorine-containing resin composition. More particularly, this invention relates to a chlorinecontaining resin composition comprising a chlorinecontaining resin and a stabilizer consisting essentially of an overbased alkaline earth metal salt, zeolite, calcium hydroxide and a complex of a metal perchlorate with a polyhydric alcohol or its derivative, said composition having excellent resistance to the discoloration and deterioration in physical properties of the chlorine-containing resin, both accompanying the thermal degradation of the resin caused when the resin is subjected to thermoforming or exposed to a high temperature atmosphere for a long period of time.

BACKGROUND OF THE INVENTION

When chlorine-containing resin compositions are subjected to thermoforming or when the molded articles of said compositions are exposed to high temperatures for a long period of time, they give rise to thermal degradation accompanied by dehydrochlorination, whereby discoloration and/or deterioration in physical properties of the resin are caused. In the case of the molded articles, the commercial value is reduced significantly. Hence, it has been conventional to add to chlorine-containing resins a stabilizer which is a combination of a salt of a carboxylic acid with a metal such as barium, zinc or the like with an organic ester of phosphorous acid, a phenolic antioxidant or the like to stabilize the chlorine-containing resins.

Molded articles obtained from such stabilized chlorine-containing resin compositions have recently been used in large quantities as interior parts of automobiles. In the case of a molded article of a chlorine-containing resin composition with a soft resin formulation, a urethane is injected into the interior of the molded article or laminated onto the back side of the molded article and foamed for the purpose of making automobiles lighter, improving the impact resilience and hand of the molded article and enhancing the safety of drivers. The molded articles thus obtained are utilized as interior parts of automobiles. Such interior parts of automobiles have been produced by subjecting a resin composition to calendering or extrusion to obtain a sheet and then subjecting the sheet to vacuum forming. Therefore, the thermoforming conditions in this production are substantially the same as those in the production of general molded articles, and accordingly, the chlorine-containing resin compositions containing the above-mentioned known combination of stabilizing components are thermally stable enough under the thermoforming conditions. However, it has been difficult to form a complicated grain leather pattern on the surface of the above molded articles and even if the pattern can be formed the hand of the molded articles obtained is not satisfactory. Therefore, it has been designed to form a complicated grain leather pattern having an improved hand.

Under such circumstances, powder molding methods have been employed in recent years to realize said improvement. The powder molding methods are disclosed in, for example, Japanese Patent Application Kokai No. 60-161451, Japanese Patent Application Kokai No. 61-91238 and U.S. Pat. No. 4,659,764.

In these prior art references, a molding method is adopted which comprises adding, to a chlorinecontaining resin, a stabilizer, a platicizer, a pigment, etc., mixing them thoroughly with heating (so-called dry-blending) to obtain a resin composition in the powder form, sprinkling the powder form resin composition on a metal mold at a high temperature of 200-280° C by rotational powder molding or powder slush molding to fuse the powder particles, and cooling the fused product to obtain a molded article. The molded article for use as an interior part of automobiles obtained by the above powder molding has the advantage that the outermost layer thereof has a precise, complex, calm, leather-like pattern and hand. However, there are such problems that since, in the powder molding, a chlorine-containing resin composition in the powder form is sprinkled on a metal mold at a high temperature to fuse the powder particles without being beforehand subjected to kneading and gelation, a resin composition consisting of a chlorine-containing resin and a conventional amount of a conventional stabilizer tends to be thermally degraded with discoloration when it is subjected to the powder molding. Furthermore, there is a further problem that when the metal mold is repeatedly used in the powder molding of the above resin composition the molding surface of the metal mold is stained. In addition, the interior parts obtained by subjecting the molded article to integral molding with a urethane as a secondary processing are discolored when they are exposed to a high temperature of 80–130° C. for 300 hours or more, resulting in deterioration of quality.

In order to overcome the above severe thermal conditions in the powder molding, thermal stabilization of chlorine-containing resin with various stabilizers has so far been proposed. However, no sufficient stabilization is obtained and an improvement thereof has been desired.

SUMMARY OF THE INVENTION

This invention aims at providing a chlorinecontaining resin composition which has been thermally stabilized with a stabilizer and which has solved the technical problems of (1) thermal stabilization of a chlorine-containing resin composition in thermoforming, particularly powder molding under the severe thermal conditions, (2) staining of metal mold in repeated powder molding and (3) discoloration of an integrally molded article of said resin composition with a urethane when the article has been subjected to a high temperature for a long period of time.

According to this invention, there is provided a thermally stabilized chlorine-containing resin composition comprising a chlorine-containing resin and a stabilizer consisting essentially of (a) an overbased alkaline earth metal carboxylate or phenolate complex, (b) zeolite, (c) calcium hydroxide and (d) a complex of at least one metal perchlorate selected from the group consisting of sodium, magnesium, calcium and barium perchlorates with at least one compound selected from the group consisting of polyhydric alcohols and their derivatives.

The complex which is the component (a) of the stabilizer which is one of the constituents of the composition of this invention can be easily produced by reacting an excess equivalent of an alkaline earth metal oxide or hydroxide with an organic carboxylic acid, for example, a fatty acid of 7-18 carbon atoms, or with a phenol, for example, an alkyl phenol (the alkyl group thereof is at least one alkyl selected from the group consisting of octyl, nonyl and dodecyl), in a hydrocarbon solvent or a hydrocarbon-alcohol mixed solvent. This production process is disclosed in U.S. Pat. Nos. 2,968,642; 2,971,014; 3,147,232; 3,533,975; 4,159,973; 4,252,698; etc. The complex includes, for example, overbased barium 2-ethylhexanoate, overbased barium isodecanoate, overbased barium oleate, overbased barium linoleate, overbased calcium isodecanoate, overbased calcium oleate, overbased magnesium oleate, overbased barium dodecylphenolate carbonate, overbased barium octylphenolate carbonate, overbased calcium dodecylphenolate carbonate, overbased calcium nonylphenolate carbonate, overbased calcium thiobisdodecylphenolate carbonate and overbased magnesium nonylphenolate carbonate. These overbased alkaline earth metal carboxylate and phenolate complexes can be produced easily; however, commercially available complexes may also be used. The commercially available complexes include, for example, Lubrizol LD 2105, LD 2106 and LZ 2116 which are all products of Lubrizol Corp. in U.S.A.

In this invention, the overbased alkaline earth metal carboxylate or phenolate complex is used in an amount of preferably 0.1–4 parts by weight, more preferably 0.2–2 parts by weight, per 100 parts by weight of the chlorine-containing resin.

The zeolite which is the stabilizer component (b) of this invention is a synthetic A type zeolite represented by the general formula, $Na_2O.Al_2O_3.xSiO_2.yH_2O$ ($0.5 \leq x \leq 3$ and $0.5 \leq y \leq 6$). It includes, for example, $Na_2O.Al_2O_3.SiO_2.4.5H_2O$ which is isometric (a=12.32 Å). In this invention, it is advantageous that the zeolite has a particle diameter as small as possible. The weight average particle diameter of the zeolite is preferably 10 $\mu$ or less. More preferably, the proportion of particles having particle diameters of 1–5 $\mu$ is 90% or more. In this invention, the zeolite is used in an amount of preferably 0.1–5 parts by weight, more preferably 0.5–2 parts by weight, per 100 parts by weight of the chlorine-containing resin.

The calcium hydroxide which is the stabilizer component (c) of this invention is preferably in the particle form whose weight average particle diameter is 10 $\mu$ or less. In this invention, the calcium hydroxide is used in an amount of preferably 0.5–8 parts by weight, more preferably 1–5 parts by weight, per 100 parts by weight of the chlorine-containing resin.

The complex of at least one metal perchlorate with at least one compound selected from polyhydric alcohols and their derivatives, which is the stabilizer component (d) of this invention, is preferably a complex represented by the general formula, $[Me(ClO_4)_n][R(OH)_p]_q$ (Me is sodium, magnesium, calcium or barium; n is an integer of 1–2; p is an integer of 1–3; q is an arbitrary number of 1–6; R is the residue of a polyhydric alcohol or its derivative; and qR's may be the same or different), the complex being a liquid at ordinary temperature.

$Me(ClO_4)_n$ which is one of the constituents of the complex is sodium perchlorate $NaClO_4$, magnesium perchlorate $Mg(ClO_4)_2$, calcium perchlorate $Ca(ClO_4)_2$ or barium perchlorate $Ba(ClO_4)_2$. In $[R(OH)_p]_q$, explained above R is the residue of a polyhydric alcohol or its derivative. The polyhydric alcohol and its derivative include, for example, ethylene glycol; ethylene glycol mono-$C_{1-4}$alkyl ethers such as ethylene glycol monomethyl ether, ethylene glycol monoethyl ether, ethylene glycol monoisopropyl ether, ethylene glycol monobutyl ether and the like; ethylene glycol monophenyl ether; ethylene glycol monobenzyl ether; diethylene glycol; diethylene glycol mono-$C_{1-4}$alkyl ethers such as diethylene glycol monomethyl ether, diethylene glycol monoethyl ether, diethylene glycol monobutyl ether and the like; triethylene glycol; triethylene glycol mono-$C_{1-4}$alkyl ethers such as triethylene glycol monomethyl ether, triethylene glycol monoethyl ether, triethylene glycol monobutyl ether and the like; polyethylene glycol; propylene glycol; propylene glycol mono-$C_{1-4}$alkyl ethers such as propylene glycol monomethyl ether, propylene glycol monoethyl ether, propylene glycol monobutyl ether and the like; dipropylene glycol; dipropylene glycol mono-$C_{1-4}$alkyl ethers such as dipropylene glycol monomethyl ether, dipropylene glycol monoethyl ether and the like; tripropylene glycol; 1,4-butanediol; 1,5-pentanediol; and glycerol.

The complex can be produced by reacting hydrates of at least one metal perchlorate as mentioned above with at least one compound selected from polyhydric alcohols and their derivatives at a weight ratio of preferably 10:90 to 70:30, more preferably 20:80 to 55:45. The complex obtained from the reaction at this weight ratio is a liquid which is transparent to translucent at ordinary temperature and is colorless to yellowish brown. The complex which is the stabilizer component (d) of this invention is used in an amount of preferably 0.2–5 parts by weight, more preferably 0.5–2 parts by weight, per 100 parts by weight of the chlorine-containing resin.

As described above, the chlorine-containing resin composition of this invention comprises the stabilizer components (a) to (d) as essential components. The synergistic effect of these four stabilizer components can prevent the chlorine-containing resin in the composition from being discolored and deteriorated in physical properties accompanying thermal degradation when the composition is subjected to thermoforming and even when the composition is exposed to a high temperature atmosphere for a long period of time. The four stabilizer components also show an excellent effect on the processability (e.g. plate-out) of the chlorine-containing resin composition of this invention.

The chlorine-containing resin composition of this invention may further comprise a known stabilizer for chlorine-containing resins, a known co-stabilizer and other known additives, for example, a metal salt of an organic acid, a metal phenolate, an organic metal salt, an organic ester of phosphorous acid, an antioxidant, a $\beta$-diketone compound, an inorganic metal salt compound, an epoxy compound, a light stabilizer, a processing aid, etc.

The metal salt of an organic acid is generally called "metal soap". In this case, the metal is, for example, sodium, potassium, magnesium, calcium, barium or zinc; and the organic acid forming the salt with the metal is a carboxylic acid such as hexanoic acid, octanoic acid, 2-ethylhexanoic acid, decanoic acid, isodecanoic acid, lauric acid, myristic acid, palmitic acid, stearic acid, behenic acid, palmitoleic acid, oleic acid, ricinoleic acid, linoleic acid, isostearic acid, 12-hydroxystearic acid, adipic acid, azelaic acid, sebacic acid, benzoic acid, toluic acid, xylic acid, p-t-butylbenzoic acid, p-t-octylbenzoic acid or a mixture thereof. These metal carboxylates are generally called "non- or low-toxic metal soap".

The phenol of the metal phenolate is, for example, p-t-butylphenol, p-t-octylphenol, nonylphenol, dinonylphenol, decylphenol or dodecylphenol; and the metal is, for example, magnesium, calcium or barium.

The organic metal salt is typically an organotin compound and includes, for example, dimethyltin bis(isooctyl thioglycollate), dibutyltin dilaurate, dibutyltin maleate, dibutyltin bis(mono-$C_{2-18}$alkyl maleate), dibutyltin bis(isooctyl thioglycollate), dibutyltin thiopropionate, monooctyltin tris($C_{12-14}$alkyl thioglycollate) and dioctyltin bis(isooctyl thioglycollate).

The organic ester of phosphorous acid, which may optionally be co-used in this invention, is typically a trialkyl phosphite, an alkylaryl phosphite, a bisphenol A type phosphite or a polyol ester type phosphite, and includes specifically triisooctyl phosphite, triisodecyl phosphite, trisnonylphenyl phosphite, diphenylisodecyl phosphite, diphenyltridecyl phosphite, distearylpentaerythritol diphosphite, tri2,4-di-ti-butylphenyl phosphite, tetra-$C_{12-15}$alkyl-4,4'-isopropylidenediphenyl diphosphite, tetrakisphenyldipropylene glycol diphosphite, tetrakisnonylphenyldipropylene glycol diphosphite, poly(dipropylene glycol)phenyl phosphite, etc.

The antioxidant which may optionally be used in this invention is a hindered phenol, for example, 2,6-di-t-butyl-4-methylphenol, 2,2'-methylenebis(4-methyl-6-t-butylphenol) or 4,4'-thiobis(6-t-butyl-3-methylphenol); or an alkyl ester of a sulfur-containing alkanoic acid, for example, dilauryl thiodipropionate, distearyl thiodipropionate or the like.

The β-diketone compound which may optionally be used in this invention includes, for example, benzoylacetone, dibenzoylmethane, myristoylbenzoylmethane, palmitoylbenzoylmethane, stearoylbenzoylmethane, etc.

The co-stabilizer which may optionally be used in this invention is typically an epoxy compound such as epoxidized soybean oil, epoxidized linseed oil, epoxidized castor oil, butyl ester of epoxidized linseed oil fatty acid, butyl or 2-ethylhexyl epoxystearate, diglycidyl ether of bisphenol A or the like. The inorganic compound includes, for example, magnesium oxide, calcium oxide, calcium phosphate, aluminum hydroxide, synthetic hydrotalcite and the like. The light stabilizer is of a benzotriazole compound or a hindered amine compound and specifically includes 2-(3,5-di-t-butyl-2-hydroxyphenyl)benzotriazole, 2-(3,5-di-t-butyl-2-hydroxyphenyl)-5-chlorobenzotriazole, polycondensate of dimethyl succinate with 1-(2-hydroxyethyl)-4-hydroxy-2,2,6,6-tetramethylpiperidine, etc. As the processing aid, an organic phosphorus compound such as nonylphenoxy polyethoxy phosphoric acid, tridecylhydroxy polyethoxy phosphoric acid or the like may be used.

The known stabilizer and the known co-stabilizer mentioned above can be appropriately used in this invention for the purpose of further improving the thermal stability, weather resistance and processability of the chlorine-containing resin composition of this invention.

The chlorine-containing resin in this invention includes, for example, a vinyl chloride homopolymer; a vinyl chloride-vinyl acetate copolymer; copolymers of a vinyl chloride and an ethylenically unsaturated monomer, for example, a vinyl chloridepropylene copolymer and the like; copolymers of a vinyl chloride and a conjugated diene, for example, a vinyl chloride-butadiene copolymer and the like; a vinyl chloride-urethane copolymer; a vinyl chloride-ethylenevinyl acetate terpolymer; and a blend of one of these (co)polymers with a chlorinated polyethylene, a chlorinated polypropylene, a polyurethane, an acrylonitrile-butadiene-styrene terpolymer, a methacrylic acid ester-butadiene-styrene terpolymer or an acrylonitrilebutadiene copolymer.

The vinyl chloride copolymers mentioned above has a bound vinyl chloride content of at least 60% by weight.

The chlorine-containing resin is preferably a mixture of 100 parts by weight of a polyvinyl chloride and 20-120 parts by weight of a plasticizer.

The chlorine-containing resin composition of this invention can be molded into semi-rigid to flexible articles depending upon the applications of the molded articles, by varying the amount of the plasticizer (e.g. trimellitic acid ester or the like) used. If necessary, the chlorine-containing resin composition can comprise appropriate amounts of a filler, a pigment, an antistatic agent, an anti-fogging agent, a flame retardant, an antifungal agent, a crosslinking agent, a blowing agent and other auxiliary reagents.

This invention is specifically described below referring to Examples. However, it should not be interpreted that this invention be restricted to these Examples.

SYNTHESIS EXAMPLE 1

120 g (1 mole) of diethylene glycol monomethyl ether was heated with stirring. When the temperature thereof reached 80° C., 112 g (0.8 mole) of sodium perchlorate monohydrate was added in small portions to suspend it in diethylene glycol monomethyl ether. The temperature of the resulting suspension was gradually elevated to 100° C. while stirring the suspension, upon which the suspension became a solution. The solution thus formed was further heated gradually, whereby the reaction proceeded with mild heat generation. Then, the reaction mixture was distilled at 110° C under reduced pressure, to remove the calculated amount of water, thereby completing the reaction. As a result, 215 g of a yellow, transparent, liquid complex was obtained.

SYNTHESIS EXAMPLE 2

The same procedure as in Synthesis Example 1 was repeated, except that 115 g (0.6 mole) of tripropylene glycol was substituted for the 120 g of diethylene glycol monomethyl ether, to obtain 210 g of a light yellow, transparent, liquid complex.

SYNTHESIS EXAMPLE 3

The same procedure as in Synthesis Example 1 was repeated, except that 138 g (1 mole) of ethylene glycol monophenyl ether was substituted for the 120 g of diethylene glycol monomethyl ether and 138 g (0.5 mole) of magnesium perchlorate trihydrate was substituted for the 112 g of sodium perchlorate monohydrate, to obtain 245 g of a yellow, transparent, liquid complex.

SYNTHESIS EXAMPLE 4

The same procedure as in Synthesis Example 3 was repeated, except that 129 g (1.1 mole) of ethylene glycol monobutyl ether was substituted for the 138 g of ethylene glycol monophenyl ether to obtain 235 g of a yellow, transparent, liquid complex.

SYNTHESIS EXAMPLE 5

The same procedure as in Synthesis Example 1 was repeated, except that 134 g (1 mole) of dipropylene glycol was substituted for the 120 g of diethylene glycol monomethyl ether and 155 g (0.5 mole) of calcium perchlorate tetrahydrate was substituted for the 112 g of sodium perchlorate monohydrate.

SYNTHESIS EXAMPLE 6

The same procedure as in Synthesis Example 1 was repeated, except that 118 g (1 mole) of ethylene glycol monobutyl ether was substituted for the 120 g of diethylene glycol monomethyl ether and 117 g (0.3 mole) of barium perchlorate trihydrate was substituted for the 112 g of sodium perchlorate monohydrate.

Each of the complexes [the stabilizer component (d) of this invention obtained in Synthesis Examples 1-6 was measured for infrared absorption spectrum using an infrared spectrophotometer. As a result, the complexes showed characteristic absorptions of $Me(ClO_4)_n$ at 1140-1060 $cm^{-1}$ and 630 $cm^{-1}$, and those of $R(OH)_p$ at 3600-3200 $cm^{-1}$.

Also, the liquid complexes obtained in Synthesis Examples 1-6 were subjected to test for evaluation of dangerousness of unstable substances, by the following test method which is described in T. Yoshida, "Kagakuyakuhin no Anzen" (Safety of Chemicals), 1982:

(a) Test for heat-generatability and stability by differential scanning colorimetry None of the liquid complexes obtained in Synthesis Examples 1-6 exhibited such behavior as heat generation or the like in a temperature range of 60°-220° C. and all of them were stable in the temperature range.

(b) Dewar vessel test

A storage test at constant temperature under heat accumulation conditions was conducted by storing a sample at a temperature of 150° C. for 168 hours to evaluate its degradability under heat accumulation conditions. As a result, none of the liquid complexes obtained in Synthesis Examples 1-6 showed such behaviors as heat generation, thermal degradation and the like due to heat-accumulation.

These test results indicated that none of the complexes obtained above had fear of heat generation, thermal degradation, etc.

EXAMPLEs 1-8 AND COMPARATIVE EXAMPLES 1-5

In order to examine the thermal stability, processability, etc. of the chlorine-containing resin composition of this invention containing the stabilizer components (a) to (d), various tests were conducted using the following compounds:

| Formulation | |
|---|---|
| Vinyl chloride resin*[1] | 100 parts by weight |
| Plasticizer*[2] | 60 parts by weight |
| Epoxidized soybean oil | 3 parts by weight |
| Organic ester of phosphorons acid*[3] | 0.8 part by weight |
| Stabilizer (See Table 1) | (See Table 1) |
| Fine powder vinyl chloride resin for paste*[4] | 15 parts by weight |

Note:
*[1] Zeon 103 EP-8, a product of Nippon Zeon Co., Ltd., having an average polymerization degree of 800
*[2] Vinycizer N-80 (tri-n-octyl trimellitate), a product of Kao Corp.
*[3] Tetraalkyl($C_{12-15}$)bisphenol A diphosphite
*[4] A fine powder for paste, having an average polymerization degree of 850 and containing 90% or more of particles which pass through a 200-mesh (Tylor) screen.

(1) Preparation of resin composition in the powder form

Into a 20-liter Henschel mixer was charged 2,000 g of a vinyl chloride resin, and the number of revolutions of the mixer was set at 1,000 rpm. Then, the stabilizer was added to the resin in an amount as indicated in the above formulation, and the resulting mixture was stirred with heating. When the temperature reached 60° C., the epoxidized soybean oil and the plasticizer were added to the mixture in this order, and stirring was further effected with heating. The temperature of the resin composition reached 120° C., and the stirring (dry blending) was continued for 30 minutes at that temperature. The mixture in the Henschel mixer was cooled with water. At 40° C., 300 g of the fine powder vinyl chloride resin for paste was added to the cooled mixture, and stirring was effected for 5 minutes to obtain a vinyl chloride resin composition in the powder form.

(2) Preparation of sheet

A nickel-chromium steel plate having a size of 300 mm×300 mm×1.5 mm (thickness) was heated in a Geer oven at 240° C. and then taken out. On the mirror surface of the plate, 200 g of the resin composition in the powder form prepared in (1) above was sprinkled in the form of a disc of 200 mm in diameter. The resin composition on the surface wa allowed to stand for 10 seconds to fusion-bond particles of the resin to the plate. Then, the unbonded particles of the resin composition was wiped off. The plate with the fused resin was placed again in the Geer oven at 240° C for 50 seconds to melt the resin, after which the plate with the molten resin was taken out of the oven and immediately subjected to rapid cooling. A resin sheet of 200 mm in diameter and 0.75 mm in thickness was separated from the plate.

This sheet was subjected to the following tests.

Test 1

(a) The sheet was placed in a Geer oven at 260° C. for a given period of time and then examined for the discoloration due to thermal degradation and the time taken until the sheet resin was decomposed to black.

(b) The sheet was also examined for peelability from the plate and staining on the mirror surface of the plate (plate-out) when the sheet was separated from the plate.

The results of Test 1 are shown in Table 2.

(3) Integral molding with urethane foam

The sheet obtained by the method of (2) above was set in a metal mold. On this sheet set in the metal mold was poured a starting mixture for urethane foam, obtained by stirring a polyol (EP-3033, a product of Mitsui Toatsu Chemicals, Inc.) and a polyisocyanate (MDI-CR-200, a product of the same company) in a weight ratio of 10:7. The starting mixture for urethane foam was then foamed, to obtain an integrally molded article of 20 mm in thickness, consisting of a vinyl chloride sheet and an urethane foam.

The molded article was subjected to the following test.

Test 2

(a) The molded article was placed in a Geer oven heated at 120° C. for a long period of time to examine the discoloration due to heat accumulation. When 200 hours elapsed in the course of the heating, blooming or bleeding was examined.

(b) The molded article heated at 120° C. for a long period of time was tested for elongation (%) in accordance with JIS K 7113-81 "Method of Tensile Test of Plastics".

The results of Test 2 are shown in Table 3.

TABLE 1

| | Components of stabilizer (parts by weight) | | | | | |
|---|---|---|---|---|---|---|
| | Overbased alkaline earth metal salt (a) | | Zeolite (b) | Calcium hydroxide (c) | Complex (d) | |
| | Kind | Amount | | | Kind | Amount |
| Ex. 1 | Overbased barium nonylphenolate carbonate (Ba 28%) | 0.7 | 1.5 | 3.0 | Syn. Ex. 1 | 1.2 |
| Ex. 2 | Overbased barium nonylphenolate carbonate (Ba 28%) | 0.7 | 1.5 | 3.0 | Syn. Ex. 3 | 1.5 |
| Ex. 3 | Overbased barium nonylphenolate carbonate (Ba 28%) | 0.7 | 1.5 | 3.0 | Syn. Ex. 5 | 1.5 |
| Ex. 4 | Overbased barium nonylphenolate carbonate (Ba 28%) | 0.7 | 1.5 | 3.0 | Syn. Ex. 6 | 1.5 |
| Ex. 5 | Overbased barium oleate (Ba 34%) | 0.5 | 1.5 | 3.0 | Syn. Ex. 2 | 1.2 |
| Ex. 6 | Lubrizol LD 2105 (Ca 7.2%) | 2.5 | 1.5 | 3.0 | Syn. Ex. 1 | 1.2 |
| Ex. 7 | Lubrizol LD 2106 (Ba 27.5%) | 0.7 | 1.5 | 3.0 | Syn. Ex. 4 | 1.2 |
| Ex. 8 | Lubrizol LZ 2116 (Ba 34%) | 0.5 | 1.5 | 3.0 | Syn. Ex. 2 | 1.2 |
| Comp. Ex. 1 | Overbased barium oleate (Ba 34%) | 0.5 | — | — | Syn. Ex. 1 | 0.2 |
| Comp. Ex. 2 | — | — | 1.5 | 3.0 | Syn. Ex. 1 | 1.2 |
| Comp. Ex. 3 | Overbased barium nonylphenolate carbonate (Ba 28%) | 0.7 | 1.5 | 3.0 | — | — |
| Comp. Ex. 4 | Barium oleate | 0.9 | 1.5 | 3.0 | Syn. Ex. 1 | 1.2 |
| Comp. Ex. 5 | Overbased barium nonylphenolate carbonate (Ba 28%) | 0.7 | 1.5 | 3.0 | $NaClO_4$ | 0.54 |
| Comp. Ex. 6 (Control) | — | — | — | — | — | — |

TABLE 2

(Test 1)

| Kind of stabilizer | Color of sheet heated at 260° C. in Geer oven | | | | | Peelability from metal mold | Metal mold staining |
|---|---|---|---|---|---|---|---|
| | Original sheet | After 2 min. | After 4 min. | After 8 min. | After 15 min. | | |
| Example 1 | Colorless | Colorless | Slightly yellow | Yelllow | Brown | Good | Good |
| Example 2 | Colorless | Colorless | Slightly yellow | Yellowish brown | Brown | Good | Good |
| Example 3 | Colorless | Colorless | Slightly yellow | Yellowish brown | Brown | Good | Good |
| Example 4 | Colorless | Colorless | Slightly yellow | Yellowish brown | Brown | Good | Good |
| Example 5 | Colorless | Colorless | Colorless | Yellow | Brown | Very good | Very good |
| Example 6 | Colorless | Colorless | Colorless | Yellow | Black in 12 minutes | Good | Good |
| Example 7 | Colorless | Colorless | Slightly yellow | Brown | Brown | Good | Good |
| Example 8 | Colorless | Colorless | Colorless | Yellow | Brown | Very good | Very good |
| Comparative Example 1 | Colorless | Slightly yellow | Black | — | Black in 3.5 min. | Bad | Bad |
| Comparative Example 2 | Colorless | Slightly yellow | Yellowish brown | Brown | Black | Medial | Bad |
| Comparative Example 3 | Slightly yellow | Slightly yellow | Yellow | Brown | Brown | Medial | Medial |
| Comparative Example 4 | Colorless | Slightly yellow | Yellow | Yellowish brown | Black | Good | Bad |
| Comparative Example 5 | Slightly yellow | Slightly yellow | Yellow | Brown | Partially black | Medial | Medial |
| Comparative Example 6 (Control) | Yellow | Yellowish brown | Black | — | Black in 2.5 min. | Very bad | Medial |

TABLE 3

(Test 2)

| Kind of stabilizer | Color of sheet heated at 120° C. | | | | | Elongation (%) | |
|---|---|---|---|---|---|---|---|
| | After 96 hr. | After 200 hr. | | After 300 hr. | After 400 hr. | Original sheet | After 300 hr. |
| | | Color | Blooming or bleeding | | | | |
| Example 1 | colorless | Slightly yellow | Good | Yellow | Yellowish brown | 305 | 210 |

TABLE 3-continued (Test 2)

| | Color of sheet heated at 120° C. | | | | | Elongation (%) | |
|---|---|---|---|---|---|---|---|
| | | After 200 hr. | | | | | |
| Kind of stabilizer | After 96 hr. | Color | Blooming or bleeding | After 300 hr. | After 400 hr. | Original sheet | After 300 hr. |
| Example 2 | Slightly yellow | Slightly yellow | Good | Yellowish brown | Brown | 290 | 200 |
| Example 3 | Slightly yellow | Slightly yellow | Good | Yellowish brown | Brown | 295 | 205 |
| Example 4 | Slightly yellow | SLightly yellow | Good | Yellowish brown | Brown | 308 | 210 |
| Example 5 | colorless | Slightly yellow | Good | Yellow | Yellowish brown | 310 | 215 |
| Example 6 | colorless | colorless | Slightly good | Yellow | Brown | 288 | 197 |
| Example 7 | colorless | colorless | Good | Yellowish brown | Brown | 302 | 203 |
| Example 8 | colorless | slightly yellow | Good | Yellow | Yellow | 305 | 208 |
| Comparative Example 1 | Slightly yellow | Yellow | Very bad | Brown | black | 321 | 210 |
| Comparative Example 2 | Slightly yellow | Yellow | Bad | Brown | Black | 250 | 150 |
| Comparative Example 3 | Slightly yellow | Brown | Medial | Dark brown | — | 260 | 33 |
| Comparative Example 4 | Slightly yellow | Yellow | Bad | Yellowish brown | Black | 280 | 165 |
| Comparative Example 5 | Slightly yellow | Brown | Bad | Dark brown | — | 269 | 66 |
| Comparative Example 6 (control) | Yellow | Yellowish brown | Medial | Black | — | 160 | — |

What is claimed is:

1. A thermally stabilized chlorinecontaining resin composition comprising a chlorine-containing resin and a stabilizer consisting essentially of (a) an overbased alkaline earth metal carboxylate or phenolate complex, (b) zeolite, (c) calcium hydroxide and (d) a complex obtained by reacting hydrates of at least one metal perchlorate $Me(ClO_4)_n$ in which n is 1 or 2 selected from the group consisting of $NaClO_4$, $Mg(ClO_4)_2$, $Ca(ClO_4)_2$ and $Ba(ClO_4)_2$ with at least one compound selected from the group consisting of aliphatic dihydric and trihydric alcohols and their lower alkyl, phenyl, and benzyl monoethers at a weight ratio of 10:90 to 70:30, the complex being liquid at ordinary temperature.

2. A composition according to claim 1, wherein the chlorine-containing resin is a vinyl chloride homopolymer, a copolymer of vinyl chloride and an ethylenically unsaturated monomer, a vinyl chloridevinyl acetate copolymer or a vinyl chloride-ethylenevinyl acetate terpolymer, the copolymers and the terpolymer having a bound vinyl chloride content of at least 60% by weight.

3. A composition according to claim 1, which further contains, as a blending polymer, at least one polymer selected from the group consisting of a methacrylate-butadiene-styrene terpolymer, an acrylonitrile-butadiene copolymer and a polyurethane.

4. A composition according to claim 1, wherein the chlorine-containing resin is a mixture of 100 parts by weight of a polyvinyl chloride and 20-120 parts by weight of a plasticizer.

5. A composition according to claim 1, wherein the component (a) of the stabilizer is overbased barium isodecanoate, overbased barium oleate, overbased barium linoleate, overbased calcium isodecanoate, overbased calcium oleate, overbased magnesium oleate, overbased barium dodecylphenolate carbonate, overbased barium octylphenolate carbonate, overbased calcium dodecylnonylphenolate carbonate, overbased calcium thiobisdodecylphenolate carbonate or overbased magnesium nonylphenolate carbonate.

6. A composition according to claim 1, wherein the component (a) of the stabilizer is overbased barium octylphenolate carbonate, overbased barium dodecylphenolate carbonate, overbased calcium dodecylnonylphenolate carbonate or overbased magnesium nonylphenolate carbonate.

7. A composition according to claim 1, wherein the component (a) of the stabilizer is overbased barium 2-ethylhexanoate, overbased barium oleate, overbased barium linoleate, overbased calcium isodecanoate, overbased calcium oleate or overbased magnesium oleate.

8. A composition according to claim 1, wherein the component (a) of the stabilizer is contained in an amount of 0.1–4 parts by weight per 100 parts by weight of the chlorine-containing resin.

9. A composition according to claim 1, wherein the component (a) of the stabilizer is contained in an amount of 0.2–2 parts by weight per 100 parts by weight of the chlorine-containing resin.

10. A composition according to claim 1, wherein the component (b) of the stabilizer is a synthetic A type zeolite represented by $Na_2O.Al_2O_3.xSiO_2.yH_2O$ ($0.5 \leq x \leq 3$ and $0.5 \leq y \leq 6$).

11. A composition according to claim 1, wherein the component (b) of the stabilizer is a synthetic A type zeolite represented by $Na_2O.Al_2O_3.xSiO_2.4.5H_2O$.

12. A composition according to claim 1, wherein the component (b) of the stabilizer is zeolite particles having a weight average particle diameter of 10 microns or less and contained in an amount of 0.1–5 parts by weight per 100 parts by weight of the chlorinecontaining resin.

13. A composition according to claim 12, wherein the component (b) of the stabilizer is contained in an amount of 0.5–2 parts by weight per 100 parts by weight of the chlorine-containing resin.

14. A composition according to claim 1, wherein the component (c) of the stabilizer is contained in an amount of 0.5-8 parts by weight per 100 parts by weight of the chlorine-containing resin.

15. A composition according to claim 1, wherein the component (c) of the stabilizer is in the form of particles having a weight average particle diameter of 10 microns or less and contained in an amount of 1-5 parts by weight per 100 parts by weight of the chlorinecontaining resin.

16. A composition according to claim 1, wherein said at least one compound is selected from the group consisting of ethylene glycol, ethylene glycol mono-$C_{1-4}$alkyl ethers and ethylene glycol monophenyl ether.

17. A composition according to claim 1, where said at least one compound is selected from the group consisting of diethylene glycol and diethylene glycol mono-$C_{1-4}$alkyl ethers.

18. A composition according to claim 1, wherein said at least one compound is selected from the group consisting of propylene glycol and propylene glycol mono-$C_{1-4}$alkyl ethers.

19. A composition according to claim 1, wherein, said at least one compound is selected from the group consisting of triethylene glycol, polyethylene glycol, dipropylene glycol and tripropylene glycol.

20. A composition according to claim 1, wherein the weight ratio is from 20 : 80 to 55 : 45.

21. A composition according to claim 1, wherein the stabilizer component (d) is contained in an amount of 0.2-5 parts by weight per 100 parts by weight of the chlorine-containing resin.

22. A composition according to claim 1, wherein the stabilizer component (d) is contained in an amount of 0.5-2 parts by weight per 100 parts by weight of the chlorine-containing resin.

23. A composition according to claim 1, which further comprises at least one metal soap selected from the group consisting of magnesium, calcium, barium and zinc salts of organic acids.

24. A composition according to claim 1, which further comprises at least one organic ester of phosphorous acid selected from the group consisting of trialkyl type phosphites, alkylaryl type phosphites, bisphenol A type phosphites and polyol ester type phosphites.

25. A composition according to claim 1, which further comprises a β-diketone compound or an epoxy compound.

26. A composition according to claim 1, wherein the component (d) of the stabilizer is a complex represented by q wherein $Me(ClO_4)_n$ is as defined in claim 1 and R is the residue of aliphatic dihydric or trihydric alcohols or their lower alkyl, phenyl or benzyl monoethers and p is an integer of 1 to 3, and q is an arbitrary number of 1-6.

* * * * *